United States Patent
Misumi et al.

(10) Patent No.: US 9,573,439 B2
(45) Date of Patent: Feb. 21, 2017

(54) AIR CONDITIONER FOR VEHICLE

(75) Inventors: Haruki Misumi, Higashihiroshima (JP); Manabu Maeda, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 993 days.

(21) Appl. No.: 13/428,553

(22) Filed: Mar. 23, 2012

(65) Prior Publication Data
US 2012/0240607 A1 Sep. 27, 2012

(30) Foreign Application Priority Data
Mar. 25, 2011 (JP) .................. 2011-067561

(51) Int. Cl.
*F25D 21/00* (2006.01)
*B60H 1/32* (2006.01)
(Continued)

(52) U.S. Cl.
CPC .......... *B60H 1/3207* (2013.01); *B60H 3/0085* (2013.01); *B60H 1/00785* (2013.01);
(Continued)

(58) Field of Classification Search
CPC . B60H 1/00785; B60H 1/3204; B60H 1/3205; B60H 1/3207; B60H 2001/3244; B60H 2001/3245; F25B 47/00; F25B 47/006; F25B 47/02; F25B 2347/00; F25B 2700/11
(Continued)

(56) References Cited

U.S. PATENT DOCUMENTS 4,910,967 A * 3/1990 Takahashi .................. 62/176.1
6,035,649 A 3/2000 Straub
(Continued)

FOREIGN PATENT DOCUMENTS

JP 08-025951 1/1996
JP 11-190546 7/1999
(Continued)

OTHER PUBLICATIONS

Office action dated Feb. 4, 2014 in corresponding Japanese Application No. 2011-067561.

*Primary Examiner* — Marc Norman
*Assistant Examiner* — Daniel C Comings
(74) *Attorney, Agent, or Firm* — Harness, Dickey & Pierce, P.L.C.

(57) ABSTRACT

A vehicle air conditioner includes a cooling heat exchanger arranged in a casing, a compressor control portion which controls a compressor such that a cooling temperature at the cooling heat exchanger approaches a target cooling temperature, and a dryness determination portion which determines whether an outer surface of the cooing heat exchanger is dry or not based on a humidity in the casing. A target temperature determination portion determines the target cooling temperature to be any one of target temperatures including a first target temperature that is lower than a dew-point temperature in the casing, when the dryness determination portion determines that the cooling heat exchanger is not dry. The target temperature determination portion determines the target cooling temperature to be any one of the target temperatures other than the first target temperature, when the dryness determination portion determines that the cooling heat exchanger is dry.

17 Claims, 6 Drawing Sheets

(51) Int. Cl.
  *B60H 3/00* (2006.01)
  *B60H 1/00* (2006.01)
  *F25B 47/00* (2006.01)

(52) U.S. Cl.
  CPC ...... *B60H 2001/3245* (2013.01); *F25B 47/00* (2013.01); *F25B 47/006* (2013.01); *F25B 2347/00* (2013.01); *F25B 2700/11* (2013.01)

(58) Field of Classification Search
  USPC .......................... 62/150, 185, 272, 239, 249
  See application file for complete search history.

(56) References Cited

U.S. PATENT DOCUMENTS

| | | | |
|---|---|---|---|
| 7,234,516 B2 * | 6/2007 | Umebayashi | B60H 1/00692 165/103 |
| 2001/0049943 A1 | 12/2001 | Nakamura et al. | |
| 2003/0110790 A1 * | 6/2003 | Cheng | F25D 21/14 62/272 |
| 2004/0168452 A1 * | 9/2004 | Nakamura | 62/228.4 |
| 2008/0179413 A1 * | 7/2008 | Shao | F24F 1/022 236/44 C |
| 2011/0232310 A1 * | 9/2011 | Kawashima et al. | 62/176.1 |

FOREIGN PATENT DOCUMENTS

| | | |
|---|---|---|
| JP | 2002-114026 | 4/2002 |
| JP | 2010-179798 | 8/2010 |
| WO | WO 00/07836 | 2/2000 |

* cited by examiner

AIR CONDITIONER FOR VEHICLE

CROSS REFERENCE TO RELATED APPLICATION

This application is based on and incorporates herein by reference Japanese Patent Application No. 2011-067561 filed on Mar. 25, 2011.

TECHNICAL FIELD

The present disclosure relates to an air conditioner for a vehicle.

BACKGROUND

Conventionally, Patent Document 1 (International Patent Publication No. WO 0007836 A1) discloses regarding a vehicle air conditioner, which is provided with an evaporator of a refrigerant cycle as a cooling heat exchanger. The cooling heat exchanger is used for cooling air to be blown into a vehicle compartment. The vehicle air conditioner is made to prevent bad odor generation from the evaporator.

Specifically, the air conditioner in Patent Document 1 controls a refrigerant discharge capacity of a compressor of the refrigerant cycle, such that an evaporation temperature of refrigerant flowing in the evaporator is made to be higher or lower by a predetermined degree than a dew-point temperature of the blown air flowing into the evaporator. In this case, an outer surface of the evaporator is not repeated to be dry and wet frequently, so that the bad odor generation in the blown air is limited.

However, in Patent Document 1, for example, even if the outer surface of the evaporator is in a dry state in which the bad odor generation in the blown air is restricted, the compressor is operated such that the evaporation temperature of refrigerant flowing in the evaporator is made to be lower by the predetermined degree than the dew-point temperature of air flowing into the evaporator. That is, even in a situation where bad odor is difficult to occur in the blown air, the compressor is operated. Such unnecessary operation of the compressor may be a factor in increasing energy consumption of the vehicle air conditioner.

SUMMARY

According to an aspect of the present disclosure, an air conditioner for a vehicle includes a casing, a cooling heat exchanger, a compressor of a refrigerant cycle, a dew-point detector, a target temperature determination portion, a compressor control portion and a dryness determination portion. The casing defines an air passage through which air to be blown into a vehicle compartment passes, and the cooling heat exchanger is arranged in the casing to cool air. The compressor is configured to adjust a cooling temperature of air cooled at the cooling heat exchanger. The dew-point detector is configured to detect a physical amount relevant to a dew-point temperature in the casing, and the dew-point detector includes a humidity detection portion which detects a humidity in the casing. The target temperature determination portion is configured to determine a target cooling temperature which is a target temperature of the cooing temperature, and the compressor control portion is configured to control the compressor such that the cooling temperature approaches the target cooling temperature. The dryness determination portion is configured to determine whether an outer surface of the cooing heat exchanger is dry or not, based on the humidity, which is detected by the humidity detection portion in a stop time of air conditioning of the vehicle compartment. The target temperature determination portion determines the target cooling temperature to be any one of a plurality of target temperatures including a first target temperature that is lower by a predetermined degree than the dew-point temperature, when the dryness determination portion determines that the outer surface of the cooling heat exchanger is not dry. The target temperature determination portion determines the target cooling temperature to be any one of the plurality of target temperatures other than the first target temperature when the dryness determination portion determines that the outer surface of the cooling heat exchanger is dry.

Accordingly, bad odor generated in air to be blown into the vehicle compartment can be prevented, and energy consumption of the air conditioner can be reduced.

BRIEF DESCRIPTION OF THE DRAWINGS

The present disclosure, together with additional objectives, features and advantages thereof, will be best understood from the following description, the appended claims and the accompanying drawings in which:

DETAILED DESCRIPTION

Figure 1:
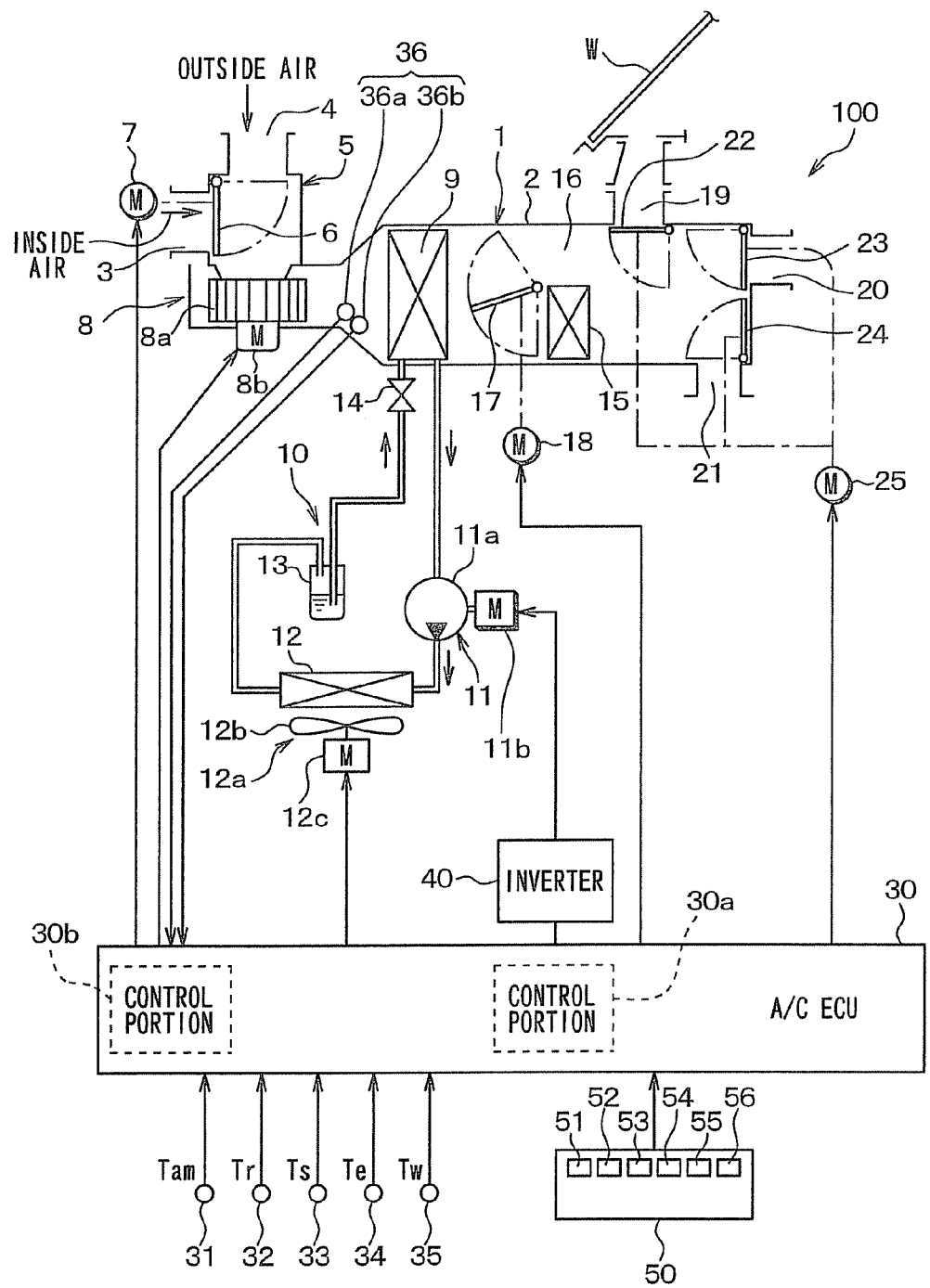
FIG. 1 is a schematic diagram showing an air conditioner for a vehicle, according to a first embodiment of the present disclosure.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration.

First Embodiment

A first embodiment of the present disclosure will be described referring to FIGS. 1 to 5. An air conditioner 100 for a vehicle, according to the first embodiment, is typically used for a hybrid vehicle which receives driving force from an internal combustion engine and an electrical motor for driving the vehicle.

A hybrid vehicle can generally switch its running states by actuating or stopping the engine depending on a running load or the like of the vehicle. For example, in one of the running states, driving force is obtained from both of the engine and the electrical motor. In another state, driving force is obtained only from the electrical motor by stopping the engine. Accordingly, the hybrid vehicle can improve its fuel efficiency as compared to a normal vehicle in which driving force is obtained only from an engine.

As shown in FIG. 1, the air conditioner 100 according to the present embodiment includes an air conditioning unit 1, a refrigerant cycle 10, and an air conditioning controller 30 (A/C ECU). The air conditioning unit 1 is arranged inside an instrument panel (dashboard) located at a front end of a vehicle compartment. The air conditioning unit 1 includes a casing 2, a blower 8, an evaporator 9, and a heater core 15. The casing 2 accommodates the blower 8, the evaporator 9 and the heater core 15, for example.

The casing 2 is formed of high-strength resin (e.g., polypropylene) having a certain level of elasticity, and defines an air passage through which air flows into the vehicle compartment. At a most upstream side of the casing 2 in a flow direction of air, an inside/outside air switching box 5 is arranged. The switching box 5 switches between an outside air introduction passage, which introduces outside air (i.e., air outside of the vehicle compartment) into the air passage of the casing 2, and an inside air introduction passage, which introduces inside air (i.e., air inside of the vehicle compartment) into the air passage of the casing 2.

Specifically, the switching box 5 includes an inside air port 3 and an outside air port 4, which introduce inside air and outside air to the air passage of the casing 2 respectively. An inside/outside air switching door 6 is disposed inside the switching box 5 to adjust open areas of the inside air port 3 and the outside air port 4 continuously, thereby adjusting a ratio between flow amounts of inside air and outside air introduced into the casing 2.

Hence, the switching door 6 is used to selectively switch an air inlet mode by adjusting the ratio between the flow amounts of inside air and outside air introduced into the casing 2. The switching door 6 is actuated by a servomotor 7 that is controlled by a control signal output from the air conditioning controller 30.

The air inlet mode includes an inside air mode, an outside air mode, and an inside/outside air mix mode. In the inside air mode, inside air is introduced into the casing 2 by fully opening the inside air port 3 and fully closing the outside air port 4. In the outside air mode, outside air is introduced into the casing 2 by fully opening the outside air port 4 and fully closing the inside air port 3. In the inside/outside air mix mode, the inside air port 3 and the outside air port 4 are opened simultaneously. The switching box 5 is adopted as an example of an inside/outside air switching portion which switches between the inside air mode and the outside air mode.

The blower 8 is located downstream of the switching box 5 in the air flow direction. The blower 8 is adopted as an example of an air blowing portion. The blower 8 blows air from the switching box 5 toward the vehicle compartment. For example, the blower 8 is an electrical blower in which a centrifugal multi-blade fan (e.g., sirocco fan) 8a is driven by an electrical motor 8b, and the rotation speed (air blowing amount) of the electrical motor 8b is controlled by a control voltage output from the air conditioning controller 30. Thus, the electrical motor 8b is adopted as an example of a blowing capacity changing portion of the blower 8.

The evaporator 9 is arranged downstream of the blower 8 in the air flow direction. The evaporator 9 is adopted as an example of a cooling heat exchanger in which the air to be blown into the vehicle compartment is cooled by heat exchange with refrigerant flowing in the evaporator 9. Specifically, the evaporator 9 is one component of the refrigerant cycle 10, which includes a compressor 11, a condenser 12, a liquid receiver 13, and an expansion valve 14, in addition to the evaporator 9.

The refrigerant cycle 10 will be described below. The compressor 11 is arranged in an engine compartment of the vehicle to draw and compress refrigerant, and then to discharge the compressed refrigerant. The compressor 11 is an electrical compressor in which a fixed-displacement compression mechanism 11a is driven by an electrical motor 11b. The fixed-displacement compression mechanism 11a is configured to discharge a fixed amount of refrigerant. The electrical motor 11b is an alternate motor, and an operation (rotation speed) of the electrical motor 11b is controlled by an alternate current output from an inverter 40.

An alternate current output from the inverter 40 has a frequency in accordance with a control signal output from the air conditioning controller 30. Thus, a rotation speed of the compressor 11 is controlled by a frequency control of the air conditioning controller 30, i.e., a refrigerant discharge capacity of the compressor 11 is changed by the frequency control. Therefore, the electrical motor 11b is adopted as a discharge capacity changing portion of the compressor 11.

The condenser 12 is arranged in the engine compartment, and cools and condenses refrigerant which has been discharged from the compressor 11. The condensation of the condenser 12 is performed by heat exchange between the discharged refrigerant from the compressor 11 and air (outside air) sent from outside of the vehicle compartment by a cooling blower 12a used as an outdoor fan.

The cooling blower 12a is an electrical fan in which an axial fan 12b is driven by an electrical motor 12c. An operation rate, i.e., a rotation speed (air blowing amount) of the electrical motor 12c is controlled by a control voltage output from the air conditioning controller 30. Thus, the electrical motor 12c is adopted as a blowing capacity changing portion of the cooling blower 12a.

The liquid receiver 13 is a gas-liquid separator, which separates refrigerant having been cooled and condensed by the condenser 12 into gas and liquid, to store surplus refrigerant therein and to discharge only the liquid refrigerant downstream. The expansion valve 14 is adopted as an example of a decompression portion which decompresses and expands refrigerant flowing out of the liquid receiver 13. For example, the expansion valve 14 is a thermostatic expansion valve, which regulates a refrigerant amount discharged downstream, so that a superheat degree of refrigerant flowing at an outlet of the evaporator 9 is adjusted within a predetermined range.

An expansion valve can be adopted as the above-described thermostatic expansion valve 14. In this case, the expansion valve 14 includes a temperature sensor located at a refrigerant-outlet side of the evaporator 9. The expansion valve 14 detects a superheat degree of refrigerant flowing at the refrigerant-outlet side of the evaporator 9 based on a temperature and a pressure of the refrigerant. The expansion valve 14 regulates its open degree (refrigerant amount) by using an automatic mechanism such that the superheat degree of refrigerant flowing at the outlet of the evaporator 9 becomes a predetermined value.

Refrigerant, which has been decompressed and expanded at the expansion valve 14, evaporates and exerts its heat absorption effect at the evaporator 9. Accordingly, the evaporator 9 functions as the cooling heat exchanger which cools the blown air. A cooling temperature Te of air flowing out of an air outlet of the evaporator 9 is determined based on an evaporation temperature (evaporation pressure) of refrigerant flowing in the evaporator 9.

Furthermore, in the present embodiment, the thermostatic expansion valve 14 as the decompression portion regulates its open degree by using the automatic mechanism such that the superheat degree of refrigerant flowing at the refrigerant-outlet side of the evaporator 9 becomes the predetermined value. Hence, the evaporation pressure of refrigerant flowing in the evaporator 9 can be determined based on the rotation speed (refrigerant discharge capacity) of the compressor 11. Therefore, the compressor 11 of the present embodiment is adopted as an example of a cooling temperature adjusting portion which adjusts the cooling temperature Te of the air flowing out of the evaporator 9.

The heater core 15 is arranged downstream of the evaporator 9 in the casing 2 in the air flow direction, to heat air passing through the heater core 15 in the casing 2. The heater core 15 is adopted as a heating heat exchanger. The heater core 15 heats air (cold air) having passed through the evaporator 9 by using coolant (hot water), which is used for cooling the engine, as a heat source.

A bypass passage 16 is provided at one side of the heater core 15 in the casing 2 so that air having passed through the evaporator 9 bypasses the heater core 15 and flows downstream. Thus, temperature of the air mixed at a downstream side of the heater core 15 and the bypass passage 16 changes depending on a ratio between an air flow amount flowing through the heater core 15 and an air flow amount flowing the bypass passage 16.

Thus, in the present embodiment, an air mix door 17 is arranged between a downstream side of the evaporator 9 and an upstream side of the heater core 15 and the bypass passage 16. The air mix door 17 continuously changes the ratio between the air flow amounts of the heater core 15 and the bypass passage 16. Hence, the air mix door 17 is adopted as a temperature adjusting portion, which adjusts the temperature of the air mixed in an air mixing portion at the downstream side of the heater core 15 and the bypass passage 16.

The air mix door 17 is driven by a servomotor 18 which is controlled by a control signal output from the air conditioning controller 30.

At the most downstream side of the casing 2, air outlets 19 to 21 are provided. Conditioned air having been temperature-adjusted is blown from the air outlets 19 to 21 into the vehicle compartment that is a space to be air-conditioned. Specifically, the air outlets 19 to 21 are a defroster air outlet 19, a face air outlet 20 and a foot air outlet 21. The defroster air outlet 19 is provided to blow conditioned air toward an inner surface of a windshield W of the vehicle. The face air outlet 20 is provided to blow conditioned air toward an upper side of a passenger seated on a seat of the vehicle compartment. The foot air outlet 21 is provided to blow conditioned air toward a lower side of the passenger seated on the seat of the vehicle compartment.

A defroster door 22, a face door 23, and a foot door 24 are provided at upstream sides of the defroster air outlet 19, the face air outlet 20 and the foot air outlet 21 in the air flow direction respectively, thereby regulating open areas of the corresponding air outlets 19 to 21.

The defroster door 22, the face door 23 and the foot door 24 are adopted as examples of an outlet mode switching portion which switches an air outlet mode. These three doors 22, 23, 24 are coupled to a servomotor 25 through a non-illustrated link mechanism, thereby being operatively linked with each other. An operation of the servomotor 25 is also controlled by a control signal output from the air conditioning controller 30.

The air outlet mode includes a face mode, a bi-level mode, afoot mode and a foot/defroster mode. In the face mode, the face air outlet 20 is fully opened so that conditioned air is blown toward the upper side of the passenger in the vehicle compartment from the face air outlet 20. In the bi-level mode, both the face air outlet 20 and the foot air outlet 21 are opened so that conditioned air is blown toward the upper and lower sides of the passenger in the vehicle compartment. In the foot mode, the foot air outlet 21 is fully opened and the defroster air outlet 19 is opened by a small open degree so that conditioned air is mainly blown from the foot air outlet 21. In the foot/defroster mode, the foot air outlet 21 and the defroster air outlet 19 are opened by an approximately same open degree so that conditioned air is blown from both the foot air outlet 21 and the defroster air outlet 19.

Furthermore, as one of the air outlet mode, a defroster mode can be set, in which the defroster air outlet 19 is fully opened so that conditioned air is blown toward the inner surface of the windshield W of the vehicle from the defroster air outlet 19, when the passenger manually controls switches of an operation panel 50.

An electrical control portion of the present embodiment will be described below. The air conditioning controller 30 includes a known microcomputer and its peripheral circuit. The microcomputer includes a central processing unit (CPU), a read-only memory (ROM), and a random-access memory (RAM). The air conditioning controller 30 performs a variety of calculations and processes based on an air conditioning control program stored in the ROM, and controls operations of various devices connected to an output side of the air conditioning controller 30.

The output side of the air conditioning controller 30 is connected to air conditioning control devices such as the servomotors 7, 18, and 25, the electrical motor 8b, the inverter 40 for the electrical motor 11b, and the electrical motor 12c.

An input side of the air conditioning controller 30 is connected to a sensor group, which is used for controlling air conditioning. The sensor group includes an outside air sensor 31, an inside air sensor 32, a solar sensor 33, an evaporator temperature sensor 34 (cooling temperature detector), a coolant temperature sensor 35, and a dew-point detector 36. The outside air sensor 31 detects an outside air temperature Tam, and the inside air sensor 32 detects an inside air temperature Tr of the vehicle compartment. The solar sensor 33 detects a solar radiation amount Ts entering into the vehicle compartment, and the evaporator temperature sensor 34 detects a temperature Te (cooling temperature of the blown air) of air immediately after flowing out of the evaporator 9. The coolant temperature sensor 35 detects a temperature Tw of coolant flowing out from the engine, and the dew-point detector 36 is arranged between the blower 8 and the evaporator 9 in the casing 2 to detect a dew-point temperature Tdew of air flowing into the evaporator 9.

For example, the evaporator temperature sensor 34 of the present embodiment detects a temperature of a fin in a heat exchanging portion of the evaporator 9. As the evaporator temperature sensor 34, a temperature detector may be adopted, which detects a temperature of another part of the evaporator 9, or which directly detects a temperature of refrigerant flowing in the evaporator 9. Furthermore, a temperature detector, which detects a temperature of air immediately after flowing out of the evaporator 9, may be also adopted as the evaporator temperature sensor 34.

The dew-point detector 36 of the present embodiment includes a humidity sensor 36a which detects a relative humidity Rein of air flowing into the evaporator 9, and a temperature sensor 36b which detects a temperature Tein of air flowing into the evaporator 9. The humidity sensor 36a and the temperature sensor 36b are incorporated into the dew-point detector 36 to output the relative humidity Rein and the temperature Tein of air flowing into the evaporator 9.

The relative humidity Rein and the temperature Tein of air flowing into the evaporator 9 are examples of physical amounts relevant to the dew-point temperature Tdew of air flowing into the evaporator 9. A humidity sensor and a temperature sensor, which are separately provided, may be adopted to detect the physical amounts without using the dew-point detector 36. In this case, the air conditioning controller 30 calculates the dew-point temperature Tdew based on detection values of the separately-provided humidity sensor and temperature sensor.

Additionally, the input side of the air conditioning controller 30 is connected to the operation panel 50 arranged near the instrument panel located at the front end of the vehicle compartment. Operation signals output from various air-conditioning operation switches of the operation panel 50 input to the input side of air conditioning controller 30.

Specifically, the air-conditioning operation switches provided at the operation panel 50 include an air-conditioner switch 51, a temperature setting switch 52, an air outlet mode switch 53, an inside/outside air selecting switch 54, a blower operation switch 55 and an automation switch 56. The air-conditioner switch 51 is used for outputting an operation command signal of the compressor 11, and the temperature setting switch 52 is used as an example of a temperature setting portion which sets a temperature Tset of the vehicle compartment. The air outlet mode switch 53 is used for manually setting the air outlet mode which is switched by selectively opening and closing the air outlet doors 22 to 24. The inside/outside air selecting switch 54 is used for manually setting the air inlet mode which is switched by selectively opening and closing the inside/outside air switching door 6. The blower operation switch 55 is used for manually changing an air blowing amount of the blower 8, and the automation switch 56 is used for performing or terminating an automatic control of the air conditioner 100.

The air conditioning controller 30 is configured to include control portions which control the above-described air conditioning control devices 7, 8b, 12c, 18, 25, and 40. In the present embodiment, for example, a compressor control portion 30a is adopted as a control portion (a hardware and a software), which controls the operation of the electrical motor 11b (specifically, the inverter 40) of the compressor 11. An inside/outside air switch control portion 30b is adopted as a control portion (a hardware and a software), which controls the servomotor 7 of the switching door 6 of the inside/outside air switching portion.

Figure 2:
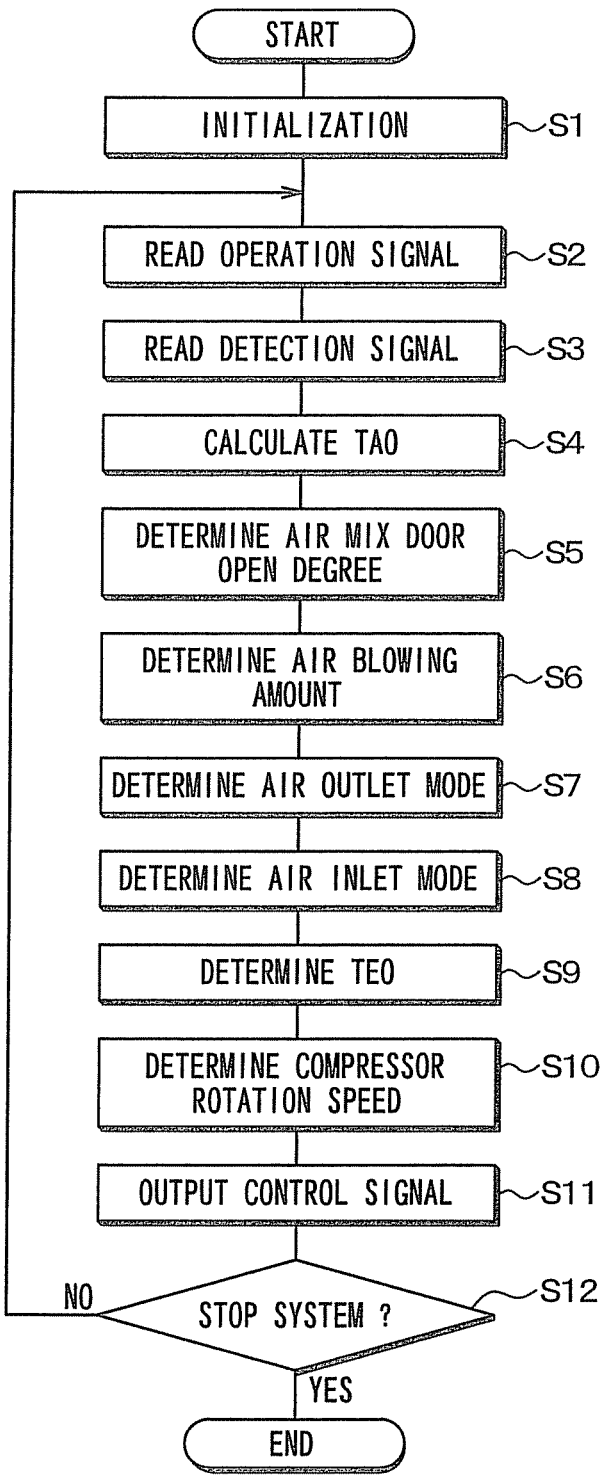
FIG. 2 is a flowchart showing a control process of the air conditioner according to the first embodiment.
Figure 3:
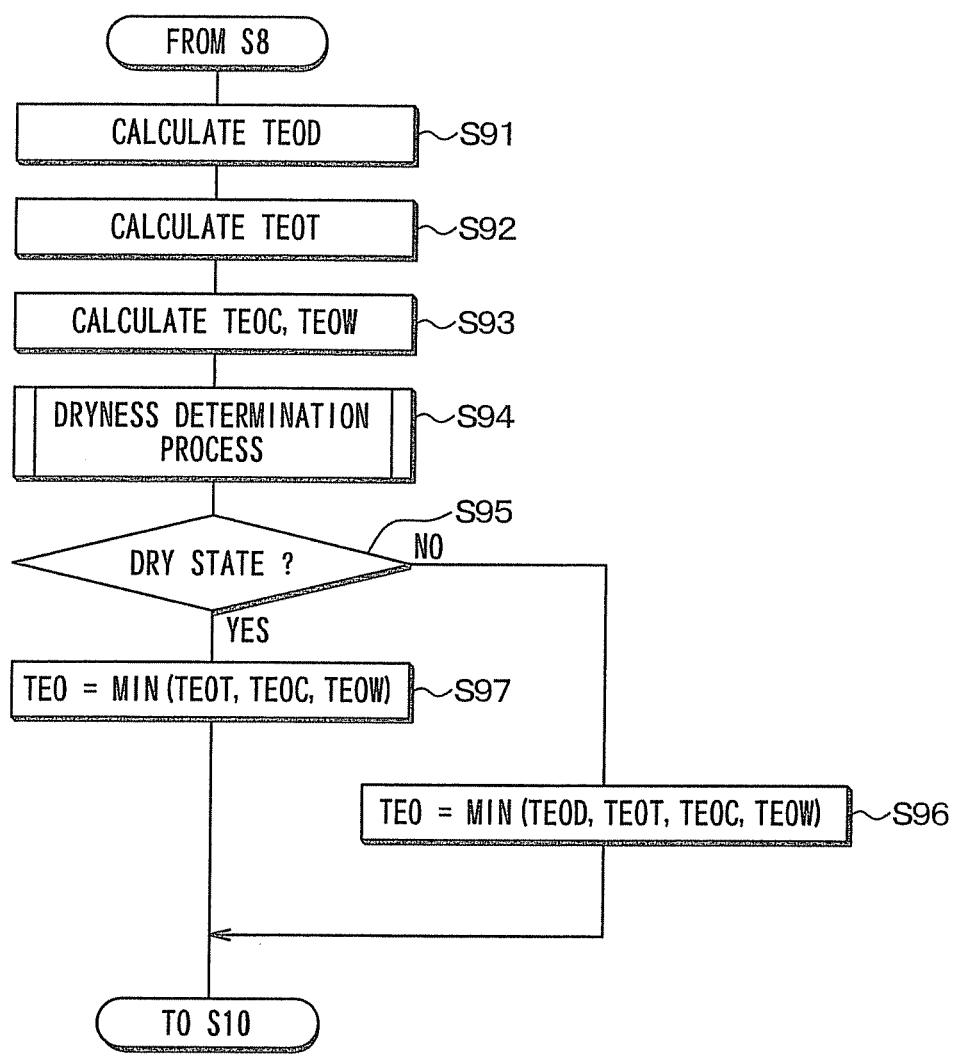
FIG. 3 is a flowchart showing a part of the control process of the air conditioner according to the first embodiment.
Figure 4:
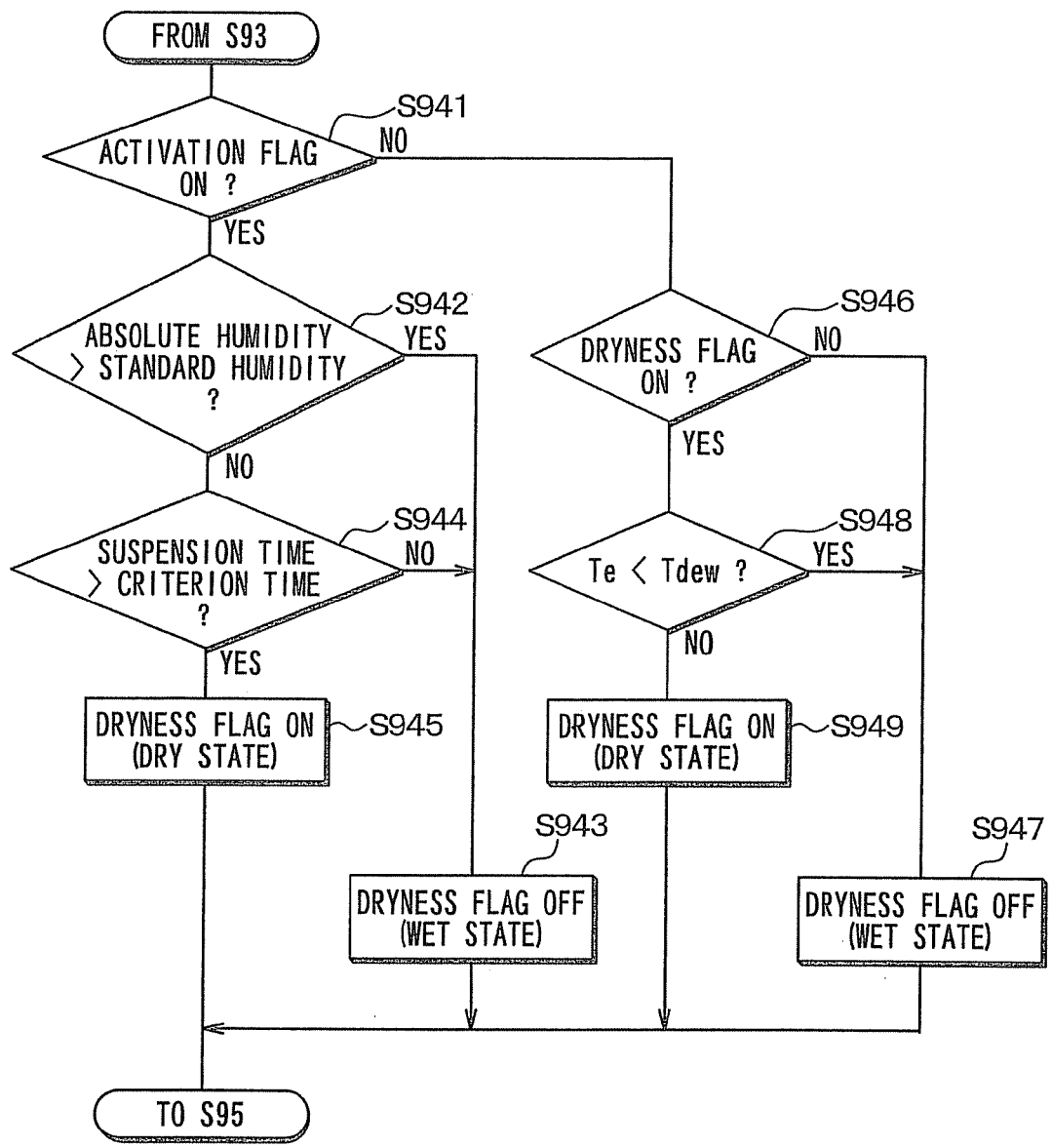
FIG. 4 is a flowchart showing a dryness determination of the control process of the air conditioner according to the first embodiment.

An operation of the air conditioner 100 will be described referring to FIGS. 2 to 5. Each of control steps in FIGS. 2 to 4 is a part of an implementation portion of various functions of the air conditioning controller 30. A control process of the air conditioner 100 starts when the automation switch 56 is switched ON in a state where the air-conditioner switch 51 of the operation panel 50 is switched ON.

At step S1, initialization of a flag, a timer, and the like is performed. In the initialization, some of flags and calculated values, which are stored at the last termination of a control operation of the air conditioner 100, are maintained. In the present embodiment, an activation flag is set to be ON at step S1, which indicates that it is just after an activation of the air conditioner 100.

At step S2, operation signals from the operation panel 50 are read in, and next at step S3, signals of a vehicle-environmental state such as detection signals of the sensor group 31 to 36 are input.

At step S4, a target outlet air temperature TAO of air blown into the vehicle compartment is calculated. The target outlet air temperature TAO is calculated by using a following formula F1.

$$TAO = Kset \times Tset - Kr \times Tr - Kam \times Tam - Ks \times Ts + C \quad (F1)$$

Here, Tset is a preset temperature of the vehicle compartment set by the temperature setting switch 52, Tr is a temperature inside the vehicle compartment (inside air temperature) detected by the inside air sensor 32. Tam is a temperature outside the vehicle compartment (outside air temperature) detected by the outside air sensor 31, and Ts is a solar radiation amount detected by the solar sensor 33. Furthermore, Kset, Kr, Kam and Ks are gains, and C is a constant value for a correction. The target outlet air temperature TAO corresponds to a thermal load of air conditioning of the vehicle compartment.

At subsequent steps S5 to S10, control states of the various devices connected to the air conditioning controller 30 are determined. At step S5, a target open degree SW of the air mix door 17 (e.g., a control signal output from the air conditioning controller 30 to the servomotor 18 of the air mix door 17) is calculated based on the target outlet air temperature TAO, the air temperature Te detected by the evaporator temperature sensor 34, and a coolant temperature Tw detected by the coolant temperature sensor 35, by using a following formula F2.

$$SW = [(TAO - Te)/(Tw - Te)] \times 100(\%) \quad (F2)$$

SW=0(%) indicates that the air mix door 17 is in a maximum cooling state, where the bypass passage 16 is fully opened and a heating air passage through which air passes through the heater core 15 is fully closed. In contrast, SW=100(%) indicates that the air mix door 17 is in a maximum heating state, where the bypass passage 16 is fully closed and the heating air passage is fully opened.

At step S6, an air blowing amount blown by the blower 8 (e.g., a control voltage output from the air conditioning controller 30 to the electrical motor 8a) is determined. The control voltage is determined based on the target outlet air temperature TAO by using a control map stored in the air conditioning controller 30, such that the control voltage becomes larger when the TAO is within a high or low temperature range than when the TAO is within a middle temperature range.

At step S7, the air outlet mode is determined. The air outlet mode is determined also based on the target outlet air temperature TAO by using a control map stored in the air conditioning controller 30. In the present embodiment, the air outlet mode is switched gradually in this odor of the foot mode, bi-level (B/L) mode and the face mode in accordance with decrease of the TAO from a low temperature region to high temperature region.

At step S8, the air inlet mode is determined by setting a switching state of the inside/outside air switching box 5. The air inlet mode is determined also based on the TAO by using a control map stored in the air conditioning controller 30. In the present embodiment, the outside air mode in which outside air is introduced is generally preferentially set, but the inside air mode, in which inside air is introduced, is set when the TAO becomes extremely low temperature, i.e., when high cooling performance is required.

At step S9, the target cooling temperature TEO of air blown out of the evaporator 9 is determined. The control operation of step S9 of the present embodiment is adopted as a target temperature determination portion. The control operation of step S9 determines the target cooling temperature TEO which is a target value of the cooling temperature Te.

Details of the control operation of step S9 will be described referring to FIG. 3.

At step S91, a first target temperature TEOD (TEOD=Tdew−α) is calculated by subtracting a predetermined standard degree α from a detection value (e.g., dew-point temperature Tdew) of the dew-point detector 36 inputted at step S3. The standard degree α is a set allowance, and is set to be 2° C., for example. When the temperature Te of air flowing out of the evaporator 9 is set to be the first target temperature TEOD, bad odor generation in air to be blown into the vehicle compartment can be limited.

At step S92, a second target temperature TEOT is calculated, which depends on the thermal load (required cooling performance) of air conditioning of the vehicle compartment. The second target temperature TEOT is calculated based on the target outlet air temperature TAO, which is calculated at step S4 and corresponds to the thermal load of air conditioning of the vehicle compartment, by using a control map stored in the air conditioning controller 30.

At step S93, third target temperatures TEOC and TEOW are calculated, which depend on the humidity of the vehicle compartment. Specifically, the third target temperatures are a comfortable target temperature TEOC and an anti-mist target temperature TEOW. When the temperature Te of air flowing out of the evaporator 9 is set to be the comfortable target temperature TEOC, it can prevent for a passenger to feel uncomfortable due to increase of the humidity of the vehicle compartment. When the temperature Te is set to be the anti-mist target temperature TEOW, the windshield W provided at the front end of the vehicle compartment can be prevented from misting.

The comfortable target temperature TEOC is determined based on the humidity of the vehicle compartment by using a control map stored in the air conditioning controller 30. The anti-mist target temperature TEOW is determined based on a humidity near (inside and outside) the windshield W by using a control map stored in the air conditioning controller 30. The humidity inside the vehicle compartment and the humidity outside the vehicle compartment may be detected by a humidity sensor, for example.

At step S94, a dryness determination is performed, in which it is determined whether an outer surface of the evaporator 9 is dry or not based on an absolute humidity inside the casing 2. The dryness determination at step S94 is performed based on steps S941 to S949 in FIG. 4, for example. The dryness determination process of step S94 of the present embodiment is an example of a dryness determination portion which determines whether the outer surface of the evaporator 9 used as the example of the cooling heat exchanger is dry or not.

Specifically, at step S941 in FIG. 4, it is determined whether the air conditioning operation is just after the activation of the air conditioner 100 or not, based on the activation flag set at step S1. When the activation flag is ON (S941: YES), the activation flag is set to be OFF, and then, a control operation of step S942 is performed.

Figure 5:
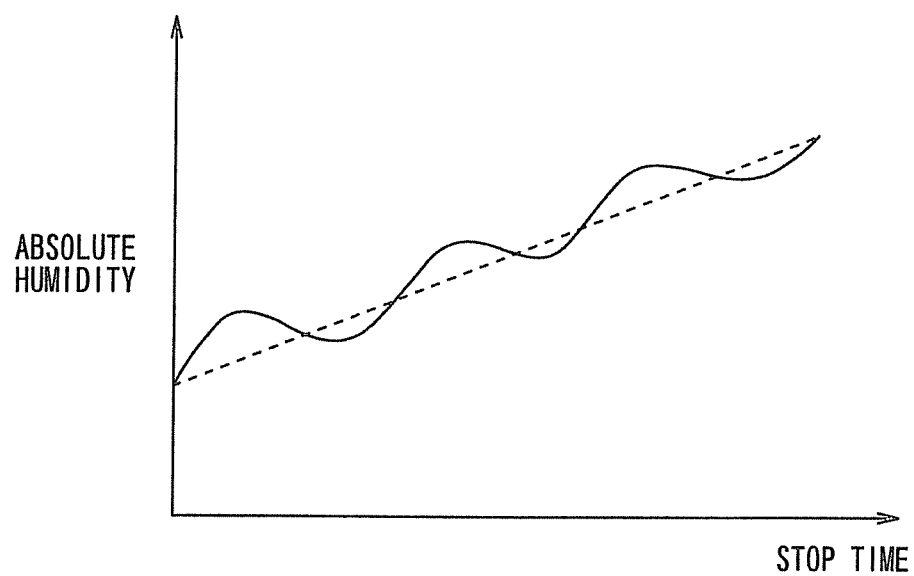
FIG. 5 is a diagram showing a relation between a stop time of air conditioning of a vehicle compartment and a humidity in the vehicle compartment in a state where an outer surface of an evaporator of the air conditioner is wet, according to embodiments of the present disclosure.

At step S942, it is determined whether the outer surface of the evaporator 9 is dry or not based on the absolute humidity inside the casing 2. As shown in FIG. 5, the absolute humidity inside the casing 2 tends to increase due to evaporation of condensation water formed on the outer surface of the evaporator 9 when the outer surface of the evaporator 9 is in a wet state after stopping air conditioning of the vehicle compartment. The absolute humidity inside the casing 2 tends to be approximately constant when the outer surface of the evaporator 9 is in a dry state after stopping air conditioning of the vehicle compartment.

Thus, at step S942 in the present embodiment, it is determined whether the outer surface of the evaporator 9 is dry or not, by using the above-described relation between the dryness state of the outer surface of the evaporator 9 and the absolute humidity inside the casing 2. Specifically, the absolute humidity (inlet absolute humidity) of air flowing into the evaporator 9 is calculated from a detection value, which has been detected by the dew-point detector 36 in the stop time of air conditioning of the vehicle compartment. And then, it is determined whether the calculated absolute humidity is higher than a predetermined standard humidity or not.

The standard humidity is a dryness standard value which is set in advance in consideration of a change rate of the absolute humidity inside the casing 2 and an evaporation rate of the condensation water on the outer surface of the evaporator 9, for example. Hence, the standard humidity is set to be lower than a humidity in which humidity decrement due to leak of moisture from the casing 2 to the vehicle compartment and humidity increment inside the casing 2 due to the evaporation of the condensation water on the outer surface of the evaporator 9 balance with each other.

When the absolute humidity inside the casing 2 is higher than the standard humidity, it can be determined that the outer surface of the evaporator 9 may be in the wet state, not in the dry state. When the absolute humidity inside the casing 2 is equal to or lower than the standard humidity, it can be determined that the outer surface of the evaporator 9 may be in the dry state.

As a result of the determination at step S942, when the absolute humidity of air flowing into the evaporator 9 is higher than the standard humidity (S942: YES), the outer surface of the evaporator 9 is determined to be in the wet state. Thus, at step S943, a dryness flag, which indicates the dryness state of the evaporator 9, is set to be OFF. Subsequently, a control operation of step S95 is performed.

Here, the OFF state of the dryness flag indicates that the outer surface of the evaporator 9 is in the wet state, and ON state of the dryness flag indicates that the outer surface of the evaporator 9 is in the dry state. The ON or OFF state of the dryness flag is stored in a storage portion such as the RAM of the air conditioning controller 30.

When the absolute humidity of air flowing into the evaporator 9 is equal to or lower than the standard humidity (S942: NO), the outer surface of the evaporator 9 may be determined to be in the dry state, and a control operation of step S944 is performed.

At step S944, it is determined whether a stop time (suspension time) of air conditioning of the vehicle compartment is longer than a predetermined criterion time or not. The criterion time is a base time which is set in advance in consideration of the change rate of the absolute humidity inside the casing 2 and the evaporation rate of the condensation water on the outer surface of the evaporator 9, for example. Hence, the criterion time is set to be a time enough for the condensation water on the outer surface of the evaporator 9 to evaporate after stopping air conditioning of the vehicle compartment.

When the stop time of air conditioning of the vehicle compartment is determined to be equal to or shorter than the criterion time (S944: NO), an evaporated amount of the condensation water on the outer surface of the evaporator 9 may be small, and the absolute humidity inside the casing 2 may not increase much. Thus, at step S943, the dryness state of the evaporator 9 is determined as the wet state, and the dryness flag is set to be OFF.

When the stop time of air conditioning of the vehicle compartment is determined to be longer than the criterion time (S944: YES), the evaporator 9 is determined to be in the dry state. Hence, at step S945, the dryness flag is set to be ON. Subsequently, the control operation of step S95 is performed.

Step S941 determines that the air conditioning operation is not just after the activation, i.e., when the activation flag is OFF (S941: NO), a control operation of step S946 is performed. At step S946, it is determined whether the evaporator 9 has been determined to be in the dry state or not in the last dryness determination. Specifically, it is determined whether the dryness flag stored in the storage portion of the air conditioning controller 30 is set to be ON or not.

At step S946, when the evaporator 9 has been determined not to be in the dry state in the last dryness determination, i.e., when the dryness flag is OFF (S946: NO), the outer surface of the evaporator 9 is determined to be in the wet state. Thus, at step S947, the dryness flag is kept OFF. Subsequently, the control operation of step S95 is performed.

At step S946, when the evaporator 9 has been determined to be in the dry state in the last dryness determination, i.e., when the dryness flag is ON (S946: YES), it is determined whether the blown air temperature Te corresponding to a temperature of the evaporator 9 is lower than the dew-point temperature Tdew or not, at step S948. When the blown air temperature Te is determined to be lower than the dew-point temperature Tdew (S948: YES), the outer surface of the evaporator 9 is determined to have thereon the condensation water and is determined to be in the wet state. Hence, at step S947, the dryness flag is set to be OFF.

As a result of the determination at step S948, when the blown air temperature Te is determined to be equal to or higher than the dew-point temperature Tdew (S948: NO), the outer surface of the evaporator 9 is easy to be kept in the dry state. Thus, at step S949, the dryness flag is set to be ON. Subsequently, the control operation of step S95 is performed.

At step S95, in FIG. 3, it is finally determined whether the outer surface of the evaporator 9 is in the dry state or not, based on the dryness flag set in the dryness determination of step S94. When the dryness flag is ON, the outer surface of the evaporator 9 is determined to be in the dry state. When the dryness flag is OFF, the outer surface of the evaporator 9 is determined to be in the wet state.

When the outer surface of the evaporator 9 is determined to be in the wet state at step S95, i.e., when the dryness flag is OFF (S95: NO), the target cooling temperature TEO is set to be the lowest one of the target temperatures TEOD, TEOT, TEOC, TEOW calculated at steps S91 to S93. Subsequently, a control operation of step S10 is performed.

When the outer surface of the evaporator 9 is determined to be in the dry state at step S95, i.e., when the dryness flag is ON (S95: YES), the target cooling temperature TEO is set to be one of the target temperatures TEOT, TEOC, TEOW other than the first target temperature TEOD calculated at step S91 to 93. For example, at step S97, the target cooling temperature TEO is set to be the lowest one of the target temperatures TEOT, TEOC, TEOW.

In the dry state of the evaporator 9, the bad odor generation in air to be blown into the vehicle compartment is limited. Hence, in this case, the target cooling temperature TEO is not set to be the first target temperature TEOD which is set for limitation of the bad odor generation in the blown air. Subsequently, the control operation of step S10 is performed.

In FIG. 2, at step S10, a rotation speed (a control voltage output from the inverter 40 to the electrical motor 11b) of the compressor 11, i.e., a refrigerant discharge capacity of the compressor 11 is determined. Specifically, a deviation En (En=Te−TEO) between the air temperature Te and the target cooling temperature TEO determined at step S9 is calculated at first. And then, based on the calculated deviation En, a control voltage output from the inverter 40 is determined by a feedback control method using a proportional-integral control (PI control), so that the air temperature Te approaches the target cooling temperature TEO.

In the air conditioner 100 of the present embodiment, the compressor control portion 30a of the air conditioning controller 30 controls an operation of the compressor 11, so that the air temperature Te (air temperature cooled by the evaporator 9) approaches a target cooling temperature TEO.

In the present embodiment, the lowest temperature of the target cooling temperature TEO is set to be equal to or higher than 0° C. (e.g., the lowest temperature is set to be 1° C.), so that frost formation at the evaporator 9 is prevented. When the target cooling temperature TEO exceeds a predetermined limit value, the operation of the compressor 11 may be stopped. Accordingly, power consumption of the compressor 11 can be reduced, and energy conservation of the air conditioner 100 can be improved.

At step S11, control signals or the like are output from the air conditioning controller 30 to the air conditioning control devices 7, 8b, 12c, 18, 25, and 40, so that the control states determined at above-described steps S5 to S10 are set. Next at step S12, it is determined whether a termination signal for stopping the operation of the air conditioner 100 is output from the operation panel 50 or not.

When the termination signal is determined to be output at step S12 (S12: YES), the operation of the air conditioner 100 is stopped. When the termination signal is determined not to be output (S12: NO), the operation waits for a control period τ (e.g., about 250 ms), and the operation returns to step S2 after passing the control period τ.

Because the air conditioner 100 according to the present embodiment is operated as described above, refrigerant evaporates in the evaporator 9 by absorbing heat from air blown from the blower 8, thereby cooling air blown from the blower 8. Cold air cooled by the evaporator 9 flows into the heating air passage of the heater core 15 and/or the bypass passage 16 depending on an open state of the air mix door 17.

Cold air flowing into the heating air passage is reheated at the heater core 15, and then mixed with cold air having passed through the bypass passage 16 and bypassed the heater core 15, so that temperature of air is conditioned. The conditioned air is blown into the vehicle compartment through the air outlets 19 to 21. When the inside air temperature Tr in the vehicle compartment becomes lower than the outside air temperature Tam, cooling of the vehicle compartment can be provided. On the other hand, when the inside air temperature Tr in the vehicle compartment becomes higher than the outside air temperature Tam, heating of the vehicle compartment can be provided.

In the air conditioner 100 of the present embodiment, when the outer surface of the evaporator 9 is in the dry state in which bad odor generation is limited in air flowing into the vehicle compartment, the target cooling temperature TEO is determined to be one of the target temperatures other than the first target temperature TEOD, which is set for limiting the bad odor generation in air, at step S9. The control operation of step S9 is adopted as the example of the target temperature determination portion. Therefore, in such case in which the bad odor is difficult to generate at the evaporator 9, the compressor 11 can be prevented from being operated unnecessarily only for limiting the bad odor generation.

When the outer surface of the evaporator 9 is in the wet state, the target cooling temperature TEO is determined to be the lowest one of the target temperatures TEOD, TEOT, TEOC and TEOW at step S9. Then, if the target cooling temperature TEO is determined to be the first target temperature TEOD, the outer surface of the evaporator 9 can be kept in the wet state.

Therefore, the bad odor generation in air to be blown into the vehicle compartment can be limited, and energy conservation of the air conditioner 100 can be improved.

Moreover, when the outer surface of the evaporator 9 is determined to be in the dry state, and when the stop time of air conditioning of the vehicle compartment is longer than the criterion time, the target cooling temperature TEO is determined to be one of the target temperatures other than the first target temperature TEOD that is set for limiting the bad odor generation in air. Therefore, when the bad odor is difficult to generate at the evaporator 9, the unnecessary operation of the compressor 11 only for preventing the bad odor generation in air can be prevented.

Additionally, in this case in which the outer surface of the evaporator 9 is determined to be in the dry state, and in which the stop time of air conditioning of the vehicle compartment is longer than the criterion time, the target cooling temperature TEO is determined to be any one of the second target temperature TEOC, which is set depending on the thermal load of air conditioning of the vehicle compartment, and the third target temperatures TEOC and TEOW, which are set depending on the humidity in the vehicle compartment. Hence, when the outer surface of the evaporator 9 is determined to be in the dry state, the operation of the compressor 11 can be controlled depending on the thermal load of air conditioning of the vehicle compartment and on a requirement for dehumidifying the vehicle compartment. Therefore, when the cooling or dehumidifying of the vehicle compartment is not requested, the energy conservation of the air conditioner 100 can be improved by stopping the operation of the compressor 11.

Second Embodiment

A second embodiment of the present disclosure will be described with reference to FIGS. 5 and 6. In the second embodiment, descriptions of parts similar or equal to the first embodiment will be omitted or simplified.

As shown in FIG. 5, the absolute humidity in the casing 2 tends to increase with time elapses after stopping an air conditioning of the vehicle compartment when the outer surface of the evaporator 9 is in the wet state. Therefore, in the second embodiment, it is determined whether the outer surface of the evaporator 9 is in the dry state or not, based on change of the absolute humidity in the casing 2 during suspension of air conditioning of the vehicle compartment.

Figure 6:
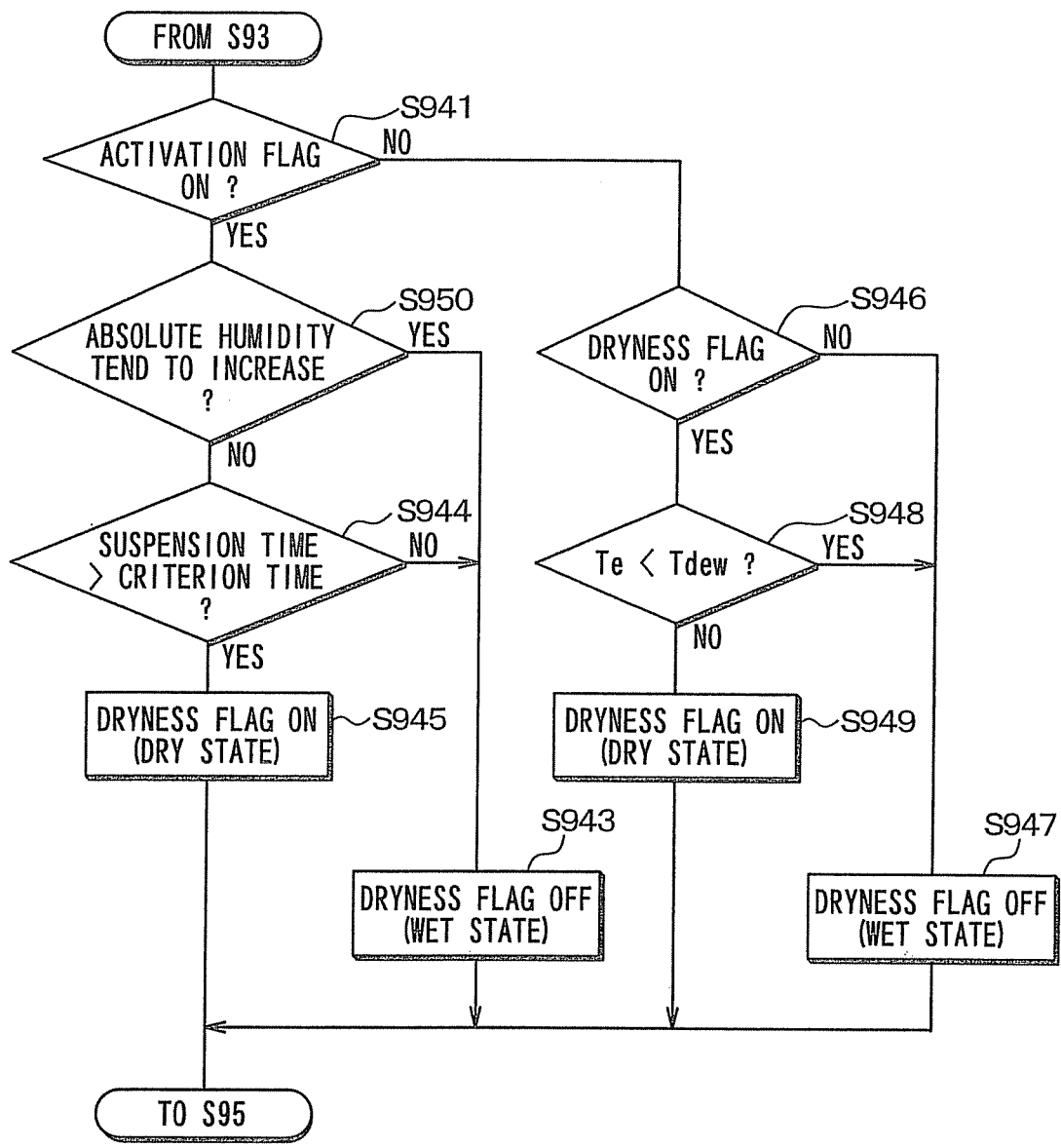
FIG. 6 is a flowchart showing a dryness determination of an air conditioner according to a second embodiment of the present disclosure.

As shown in FIG. 6, when step S941 determines that it is just after the activation of the air conditioner 100, i.e., the activation flag is ON (S941: YES), it is determined whether the absolute humidity in the casing 2 has a tendency to increase in stop time of air conditioning at step S950. The absolute humidity is calculated based on a detection value of the humidity sensor 36a.

The absolute humidity in the casing 2 may change due to an external factor such as, a temperature of the vehicle compartment and a humidity of outside air, as shown in FIG. 5. Thus, when the absolute humidity may have a tendency to decrease in a short time but has a tendency to increase in a long time, the absolute humidity in the casing 2 is determined to have a tendency to increase at step S950. For example, the absolute humidity in the casing 2 may be detected more than one time in a predetermined period during the stop time of air conditioning. Then, when the absolute humidity increases with time elapses, the absolute humidity may be determined to tend to increase.

When the absolute humidity in the casing 2 is determined to tend to increase (S950: YES), the outer surface of the evaporator 9 is determined to be in the wet state. Thus, the control operation of step S943 is performed, and the dryness flag, which indicates the dryness state of the evaporator 9, is set to be OFF. On the other hand, when the absolute humidity in the casing 2 is determined not to tend to increase (S950: NO), the outer surface of the evaporator 9 is determined to be in the dry state, and the control operation of step S944 is performed.

Similarly to the first embodiment, also in the above-described configuration of the second embodiment, when the bad odor is difficult to generate at the evaporator 9, the unnecessary operation of the compressor 11 for only limiting the bad odor generation can be prevented. Therefore, the bad odor generated in air to be blown into the vehicle compartment can be reduced, and energy consumption of the air conditioner 100 can be reduced.

Other Embodiments

The present disclosure is not limited to the above-described embodiments. The present disclosure extends into a scope where a person skilled in the art can substitute easily. A refinement based on knowledge, that a person skilled in the art generally has, can be added arbitrarily to the present disclosure. For example, the present disclosure can be modified variously as below.

(i) In the above-described embodiments, the humidity sensor 36a used as an example of a humidity detection portion, which detects the relative humidity Rein in the casing 2, is positioned between the air suction port (the inside air port 3 and the outside air port 4) and the evaporator 9. However, the position of the humidity sensor 36a is not limited to this, and the humidity sensor 36a may be arranged, for example, downstream of the evaporator 9 in the air flow direction.

(ii) The humidity sensor 36a, which detects the relative humidity Rein in the casing 2, is used as the humidity detection portion of the dew-point detector 36. However, the humidity detection portion of the dew-point detector 36 is not limited to the humidity sensor 36a. For example, a humidity detection portion, which detects the humidity in the casing 2 by calculation, may be adopted as the humidity detection portion of the dew-point detector 36.

(iii) In the above-described embodiments, at step S9 used as the example of the target temperature determination portion, when the outer surface of the evaporator 9 is determined to be in the dry state, and when the criterion time has passed after air conditioning operation is stopped, the cooling target temperature TEO is determined preferably to be one of the target temperatures other than the first target temperature TEOD. However, a criterion of the determination at step S9 is not limit to this. For example, if the outer surface of the evaporator 9 is easy to be dry, the outer surface of the evaporator 9 may be determined to be in the dry state, and the cooling target temperature TEO may be determined to be one of the target temperatures other than the first target temperature TEOD, regardless of elapsed time after air conditioning operation of the vehicle compartment is stopped.

(iv) In the above-described embodiments, the target cooling temperature TEO is determined to be one of the four target temperatures that are the first to third target temperatures TEOD, TEOT, TEOC and TEOW, but the cooling temperature TEO is not limited to the target temperatures. For example, any one of the first and second target temperatures TEOD, TEOT may be determined as the cooling target temperature TEO, or any one of the first and third target temperatures TEOD, TEOC, TEOW may be determined as the cooling target temperature TEO. Furthermore, any one of target temperatures which includes a target temperature other than the above-described target temperatures TEOD, TEOT, TEOC and TEOW may be determined as the cooling target temperature TEO.

(v) In the above-described embodiments, the evaporator 9 of the refrigerant cycle 10 is adopted as the example of the cooling heat exchanger, but the cooling heat exchanger is not limited to the evaporator 9. For example, an evaporator such as an adsorption refrigerator, in which refrigerant evaporates, may be adopted as the cooling heat exchanger.

(vi) In the above-described embodiments, the air conditioner 100 of the present disclosure is used for a hybrid vehicle, but the air conditioner 100 is not limited to be used for a hybrid vehicle. The air conditioner 100 may be used, for example, for a vehicle in which its driving force for running is obtained only from an engine, or for an electrical vehicle in which its driving force for running is obtained only from an electrical motor used for vehicle running.

Additional advantages and modifications will readily occur to those skilled in the art. The disclosure in its broader terms is therefore not limited to the specific details, representative apparatus, and illustrative examples shown and described.

What is claimed is:

1. An air conditioner for a vehicle, comprising:
a casing defining an air passage through which air to be blown into a vehicle compartment passes;
a cooling heat exchanger arranged in the casing to cool air;
a compressor of a refrigerant cycle, configured to adjust a cooling temperature of air cooled at the cooling heat exchanger;
a dew-point detector configured to detect a physical amount relevant to a dew-point temperature in the casing, the dew-point detector including a humidity detection portion which detects a humidity in the casing;
a target temperature determination portion configured to determine a target cooling temperature which is a target temperature of the cooling temperature;
a compressor control portion configured to control the compressor such that the cooling temperature approaches the target cooling temperature; and
a dryness determination portion configured to determine whether an outer surface of the cooling heat exchanger is dry or not, based on the humidity, which is detected by the humidity detection portion in a stop time of air conditioning of the vehicle compartment, wherein
the target temperature determination portion determines the target cooling temperature to be any one of a plurality of target temperatures including a first target temperature that is lower by a predetermined degree than the dew-point temperature, when the dryness determination portion determines that the outer surface of the cooling heat exchanger is not dry,
the target temperature determination portion determines the target cooling temperature to be any one of the plurality of target temperatures other than the first target temperature (i) when the dryness determination portion determines that the outer surface of the cooling heat exchanger is dry and (ii) when the stop time of air conditioning of the vehicle compartment is longer than a predetermined criterion time that is set to be long enough for condensation water on the outer surface of the cooling heat exchanger to evaporate.

2. The air conditioner for a vehicle, according to claim 1, wherein the dryness determination portion determines that the outer surface of the cooling heat exchanger is dry, when the humidity detected by the humidity detection portion in the stop time of air conditioning of the vehicle compartment is lower than a predetermined standard humidity.

3. The air conditioner for a vehicle, according to claim 1, wherein the dryness determination portion determines that the outer surface of the cooling heat exchanger is not dry, when the humidity detected by the humidity detection portion has a tendency to increase in the stop time of air conditioning of the vehicle compartment.

4. The air conditioner for a vehicle, according to claim 1, wherein
the plurality of target temperatures include a second target temperature which is set depending on a thermal load of air conditioning of the vehicle compartment, and a third target temperature which is set depending on a humidity of the vehicle compartment,
the target temperature determination portion determines the target cooling temperature to be the second target temperature or the third target temperature whichever is lower (i) when the dryness determination portion determines that the outer surface of the cooling heat exchanger is dry and (ii) when the stop time of air conditioning of the vehicle compartment is longer than a predetermined criterion time that is set to be long enough for condensation water on the outer surface of the cooling heat exchanger to evaporate.

5. The air conditioner for a vehicle, according to claim 4, wherein the second target temperature is calculated based on a target outlet air temperature.

6. The air conditioner for a vehicle, according to claim 5, wherein the target outlet air temperature corresponds to the thermal load using a first control map stored in the air conditioner.

7. The air conditioner for a vehicle, according to claim 6, wherein the third target temperature is a humidity based target temperature which is based on the humidity inside the vehicle compartment.

8. The air conditioner for a vehicle, according to claim 7, wherein the humidity based target temperature is determined using a second control map stored in the air conditioner.

9. The air conditioner for a vehicle, according to claim 4, wherein the third target temperature is a humidity based target temperature which is based on the humidity inside the vehicle compartment.

10. The air conditioner for a vehicle, according to claim 9, wherein the humidity based target temperature is determined using a first control map stored in the air conditioner.

11. The air conditioner for a vehicle, according to claim 7, wherein the third target temperature is an anti-mist target temperature.

12. The air conditioner for a vehicle, according to claim 11, wherein the anti-mist target temperature is determined based on a humidity near a windshield of the vehicle using a third control map stored in the air conditioner.

13. The air conditioner for a vehicle, according to claim 4, wherein the third target temperature is an anti-mist target temperature.

14. The air conditioner for a vehicle, according to claim 13, wherein the anti-mist target temperature is determined based on a humidity near a windshield of the vehicle using a second control map stored in the air conditioner.

15. The air conditioner for a vehicle, according to claim 1, wherein
the target temperature determination portion determines the target cooling temperature to be a lowest one of the plurality of target temperatures when the dryness determination portion determines that the outer surface of the cooling heat exchanger is not dry, and
the target temperature determination portion determines the target cooling temperature to be a lowest one of the plurality of target temperatures other than the first target temperature (i) when the dryness determination portion determines that the outer surface of the cooling heat exchanger is dry and (ii) when the stop time of air conditioning of the vehicle compartment is longer than a predetermined criterion time that is set to be long enough for condensation water on the outer surface of the cooling heat exchanger to evaporate.

16. The air conditioner for a vehicle, according to claim 1, wherein
the plurality of target temperatures consist of the first target temperature, a second target temperature and a third target temperature, and
the second target temperature is set depending on a thermal load of air conditioning of the vehicle compartment, and the third target temperature is set depending on a humidity of the vehicle compartment.

17. The air conditioner for a vehicle, according to claim 16, wherein
the target temperature determination portion determines the target cooling temperature to be a lowest one of the plurality of target temperatures when the dryness determination portion determines that the outer surface of the cooling heat exchanger is not dry, and
the target temperature determination portion determines the target cooling temperature to be a lowest one of the plurality of target temperatures other than the first target temperature (i) when the dryness determination portion determines that the outer surface of the cooling heat exchanger is dry and (ii) when the stop time of air conditioning of the vehicle compartment is longer than a predetermined criterion time that is set to be long enough for condensation water on the outer surface of the cooling heat exchanger to evaporate.

\* \* \* \* \*